United States Patent [19]
Iida et al.

[11] Patent Number: 5,203,934
[45] Date of Patent: Apr. 20, 1993

[54] PNEUMATIC RADIAL TIRE WITH HIGH DURABLE BEAD PORTIONS

[75] Inventors: Hiroyuki Iida; Hiroyuki Koseki, both of Kodaira, Japan

[73] Assignee: Bridgestone Corporation, Tokyo, Japan

[21] Appl. No.: 726,674

[22] Filed: Jul. 8, 1991

Related U.S. Application Data

[62] Division of Ser. No. 382,594, Jul. 21, 1989.

[30] Foreign Application Priority Data

Jul. 21, 1988 [JP] Japan .................. 63-180292

[51] Int. Cl.$^5$ .................. B60C 3/00; B60C 9/02
[52] U.S. Cl. .................. 152/454; 152/539; 152/546; 152/552
[58] Field of Search .......... 152/454, 539, 546, 548, 152/549, 552

[56] References Cited

U.S. PATENT DOCUMENTS

| | | | |
|---|---|---|---|
| 3,631,913 | 1/1972 | Boileau | 152/454 |
| 4,387,758 | 6/1983 | Matsuda et al. | 152/454 |

FOREIGN PATENT DOCUMENTS

| | | | |
|---|---|---|---|
| 0393965 | 10/1990 | European Pat. Off. | 152/454 |
| 0413426 | 2/1991 | European Pat. Off. | 152/454 |

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

A pneumatic radial tire with high durable bead portions includes a pair of bead portions, a pair of sidewalls and a tread extending between the sidewalls, and further includes as a body reinforcement a carcass extending between the bead portions and consisting of plies whose cords are radially arranged. At least one ply being turned up about bead cores of the bead portions from inside to outside of the tire to form a turn-up portions. A carcass pass line in radial section of the tire in its self-holding position filled with 5% of a normal inner pressure under no-load condition includes curvature changing areas in a carcass profile curved toward the turned-up portions in the proximities of positions corresponding to a height of turn-up ends of the ply from a rim diameter line to cause compressive stresses in the bead portions near to the turn-up ends of the ply by deformations of the carcass when the normal inner pressure is filled in the tire. With the above arrangement, the durability at the bead portions of the tire is improved to an extent required for prolongation of life time obtained by recapping the tire repeatedly.

5 Claims, 11 Drawing Sheets

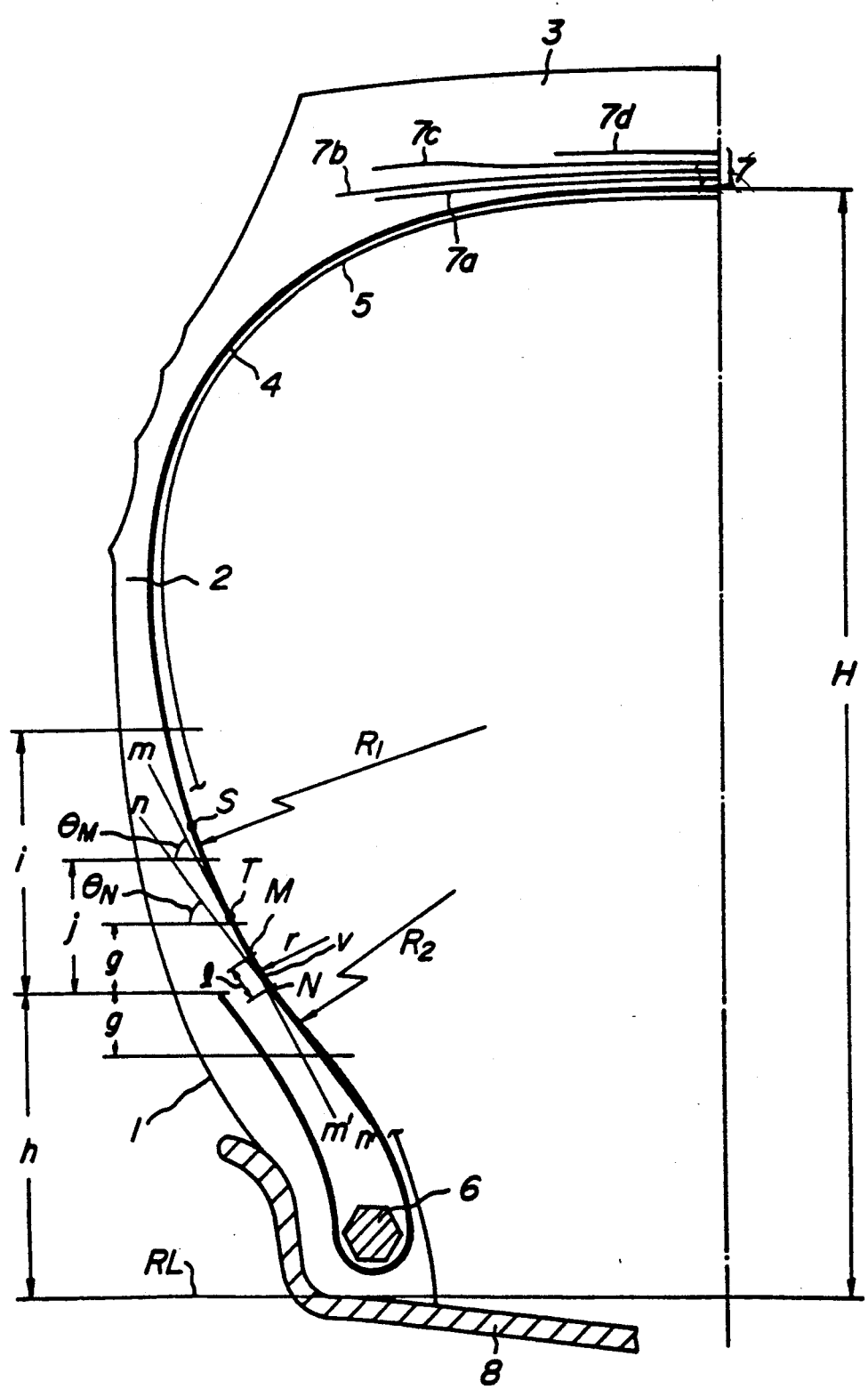
FIG._1a

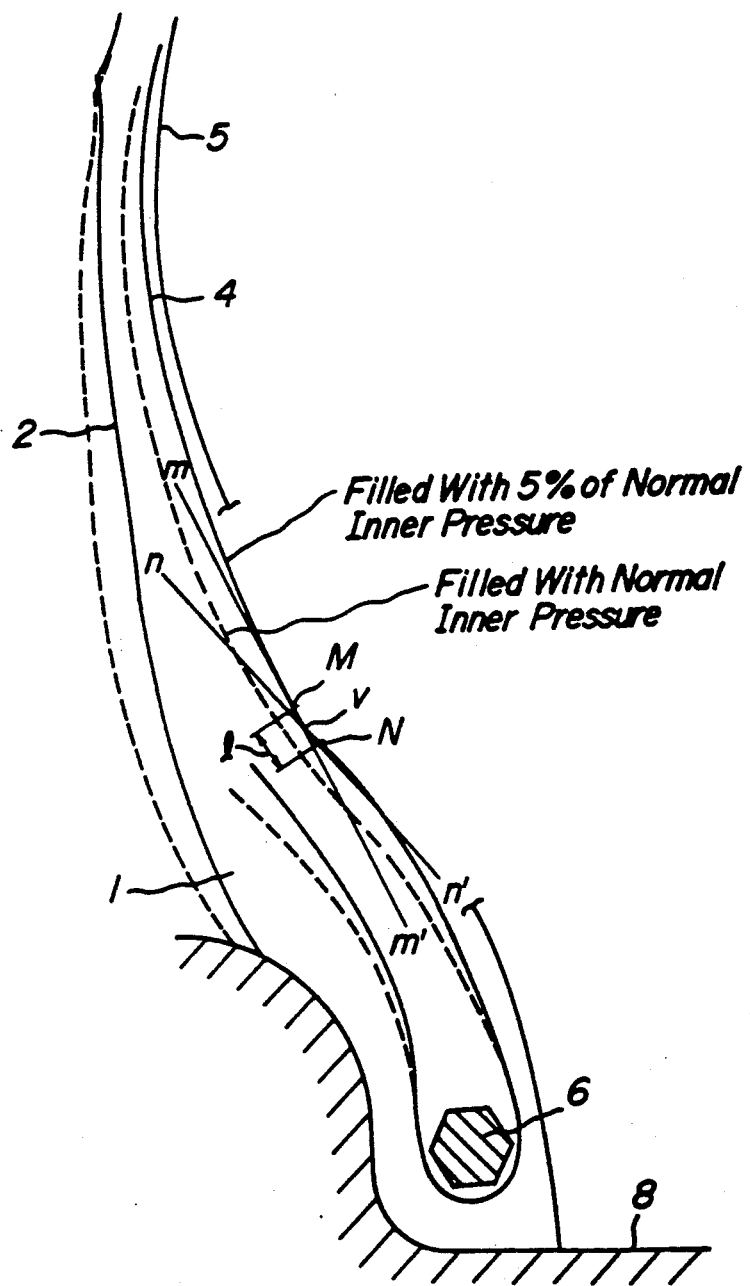
FIG_1b

FIG_2
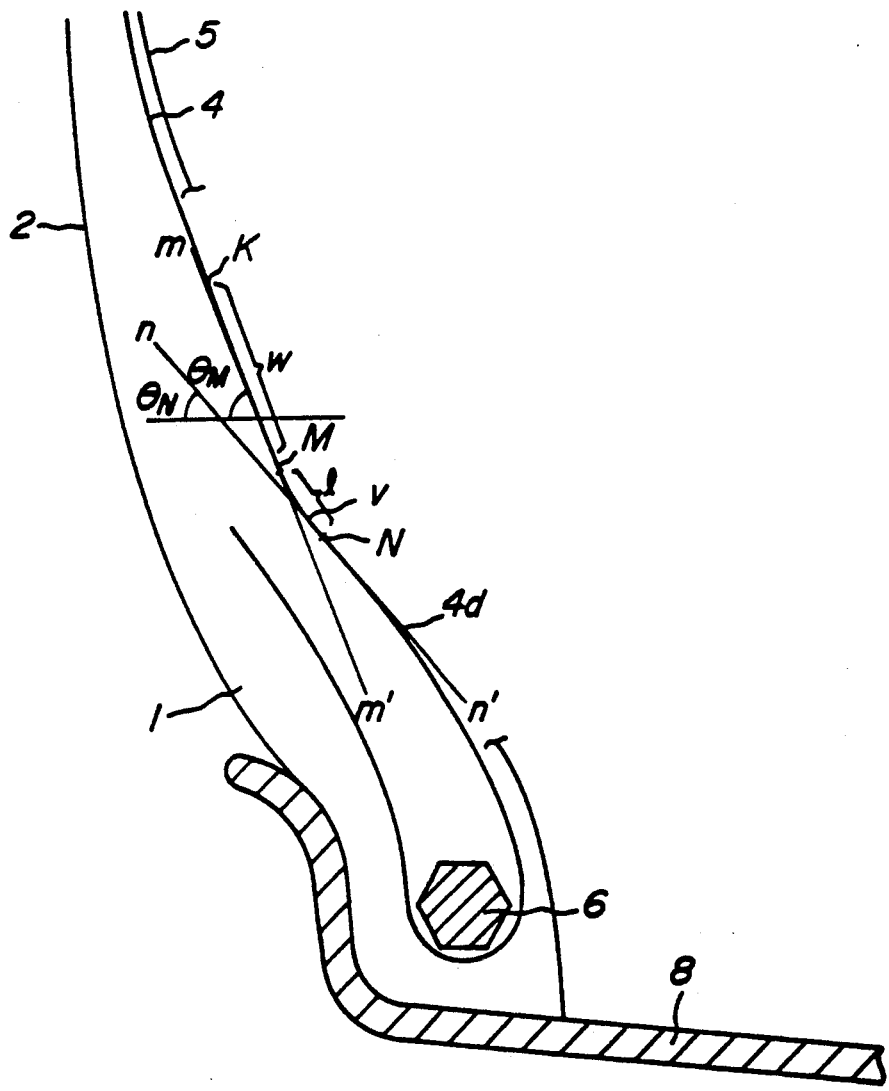

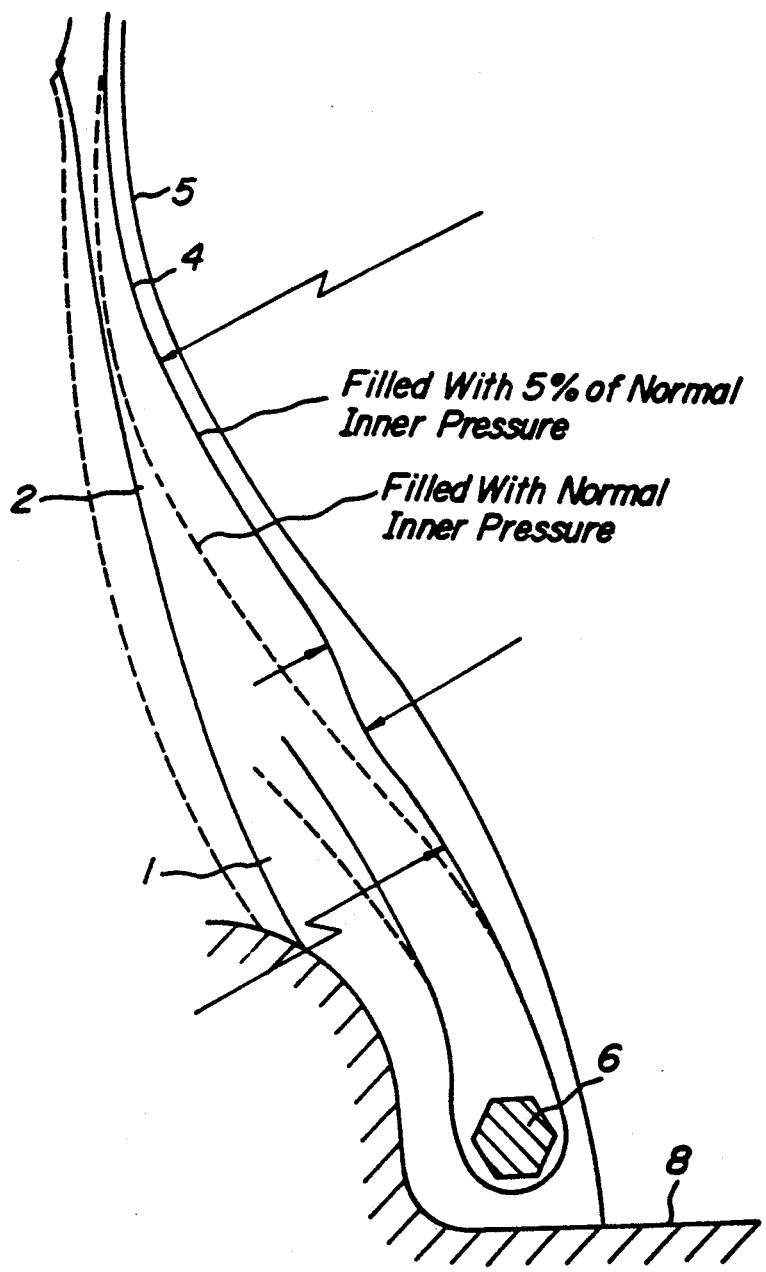
FIG_3c

PNEUMATIC RADIAL TIRE WITH HIGH DURABLE BEAD PORTIONS

This is a division of application Ser. No. 07/382,594, filed Jul. 21, 1989.

BACKGROUND OF THE INVENTION

This invention relates to a pneumatic radial tire having highly durable bead portions.

Heavy duty pneumatic radial tires to be used for trucks, buses and the like are particularly required to have high durability of bead portions. Such a requirement results from not only the severe service conditions but also the fact that they are generally used repeatedly by recapping every time tread rubbers have been torn off to realize their longest possible effective life.

With such heavy duty pneumatic radial tires, failures at bead portions are often found when they are inspected whether they are able to be used again by recapping. Such failures at the bead portions are mainly caused by high tensile strains in the proximities of turn-up ends of carcass plies, particularly radially outwards thereof. In most cases, the tensile strains give rise to rubber fatigue and separations.

In order to improve the durability of the bead portions, it has been proposed to provide reinforcing members or other particular members to mitigate the above strains and to restrain any growth of cracks due to the rubber fatigue. However, such an addition of the members detrimentally affects productivity of tires accompanying with increased cost and the occurrence of heat.

In general, the heavy duty pneumatic radial tire to be used for trucks and buses comprises a pair of bead portions, sidewalls and a tread extending between the sidewalls and further comprises as a body reinforcement a carcass extending between the bead portions and having plies whose cords are radially arranged. At least one ply of the carcass is folded from inside to outside about bead cores into a turn-up construction. In this case, the durability of the bead portions depends upon the turn-up ends of the carcass. However, direct measures for the turn-up portions to solve these problems have been insufficient to obtain useful effects.

SUMMARY OF THE INVENTION

The inventors of this application have investigated and developed a carcass profile of heavy duty pneumatic radial tires capable of improving the durability of bead portions to meet the requirement of renewal of effective life over and over again by recapping without requiring any particular reinforcing members or special members. The invention resides in the discovery that the turn-up ends of the carcass plies governing the durability of the bead portions are subjected to forces in pulling-out directions by filled inner pressure in the tire, while the sidewalls and bead portions are subjected to bending forces so that high tensile strains occur in rubbers facing to the turn-up ends resulting in failures at the bead portions, and that compressive stresses introduced into the rubbers are effective in order to reduce the tensile strains (to obtain an effect reducing the tensile strains and hence with residual tensile stresses actually).

It is an object of the invention to provide an improved heavy duty pneumatic radial tire which eliminates all the disadvantages of the prior art and improves the durability at bead portions to an extent required for prolongation of life time obtained by recapping the tire repeatedly.

In order to accomplish this object of the invention, in a pneumatic radial tire with high durable bead portions, including a pair of bead portions, a pair of sidewalls and a tread extending between the sidewalls, and further including as a body reinforcement a carcass extending between the bead portions and consisting of plies whose cords are radially arranged, at least one ply being turned up about bead cores of the bead portions from inside to outside of the tire in a turn-up construction, wherein a carcass pass line in radial section of the tire in its self-holding position filled with 5% of a normal inner pressure under no-load condition comprises curvature changing areas (v) in a carcass profile curved toward the turned-up portions in the proximity of positions corresponding to a height (h) of turn-up ends of the ply from a rim diameter line (RL) to cause compressive stresses in the bead portions near the turn-up ends of the ply by deformations of the carcass when the normal inner pressure is filled in the tire.

In a preferred embodiment, each of said curvature changing areas (v) of the carcass pass line is smoothly continuous with a zone (w) adjacent thereto and having a curvature smaller than that of the curvature changing area (v) and has a center of curvature inside the tire, or the zone (w) is a zone (w') on a side remote from the bead core and smoothly continuous with the curvature changing area (v) through an inflection point of the carcass pass line.

The curvature changing area (v) is positioned between points (M) and (N) spaced a distance (l) less than 10 mm apart from each other along the carcass pass line and within a carcass pass line area extending radial distances (g) corresponding to 8% of a maximum radial height (H) of the carcass pass line from a rim diameter line (RL) on radially inward and outward sides of the turn-up ends of the ply.

According to the invention a difference $\theta$ between angles of tangents (m-m') and (n-n') at the points (M) and (N) to the carcass line is 5° to 90°.

The zone (w) is a zone adjacent the curvature changing area (v) on a side remote from the bead core and radially extends to a point spaced from the height of the turn-up ends a distance (1) 24% of a maximum radial height (H) of the carcass pass line from a rim diameter line (HL) has a curvature within 1/500 (mm$^{-1}$) in a portion of the carcass pass line between two points (S) and (T) spaced along the pass line a distance more than 12% of the maximum radial height (H).

The zone (w') on the side remote from the bead core includes two points (P) and (Q) spaced outwardly from the end of the carcass turn-up by radial distances (i) and (j) corresponding to 12 to 24% respectively of a maximum radial height (H) of the carcass pass line from a rim diameter line (RL). The centers of curvatures of the pass line between the points (P) and (Q) are located out of the tire.

The tire preferably comprises wedge rubbers in the form of a convex lens in section along the curvature changing areas (v) inside of the carcass.

The tire according to the invention may comprise inner liners extending along an inner circumference of the carcass and each of the inner liners comprises a thicker portion corresponding to the curvature changing portion (v) of the carcass pass line.

The thickness of the thicker portion of the inner liner is preferably 1.7 to 8 times, more preferably 2 to 4 times an average thickness of the entire inner liner.

With the novel idea according to the invention, since tensile strains occurring in rubbers in the proximities of turn-up ends of carcass ply having cords radially arranged are eliminated with the aid of particular carcass profile in the form of a toroidal shape of the carcass pass line extending between bead portions without relying upon the turn-up portions themselves, any reinforcing members or particular members hitherto used as reinforcements are not needed in order to avoid any troubles of the bead portions.

When measuring the carcass profiles, the measurement should be effected after keeping a tire filled with a normal inner pressure for about 24 hours, or more preferably after running at a speed of 60 km/h under a load of the order of an empty car for about one hour, in order to remove deformations due to piled storing for a long time.

The invention will be more fully understood by referring to the following detailed specification and claims taken in connection with the appended drawings.

BRIEF DESCRIPTION OF THE DRAWINGS

FIGS. 1a and 1b, 2 and 3a-3c are sectional views exemplarily illustrating carcass pass lines of tires according to the invention;

DESCRIPTION OF THE PREFERRED EMBODIMENTS

Figure 3A:
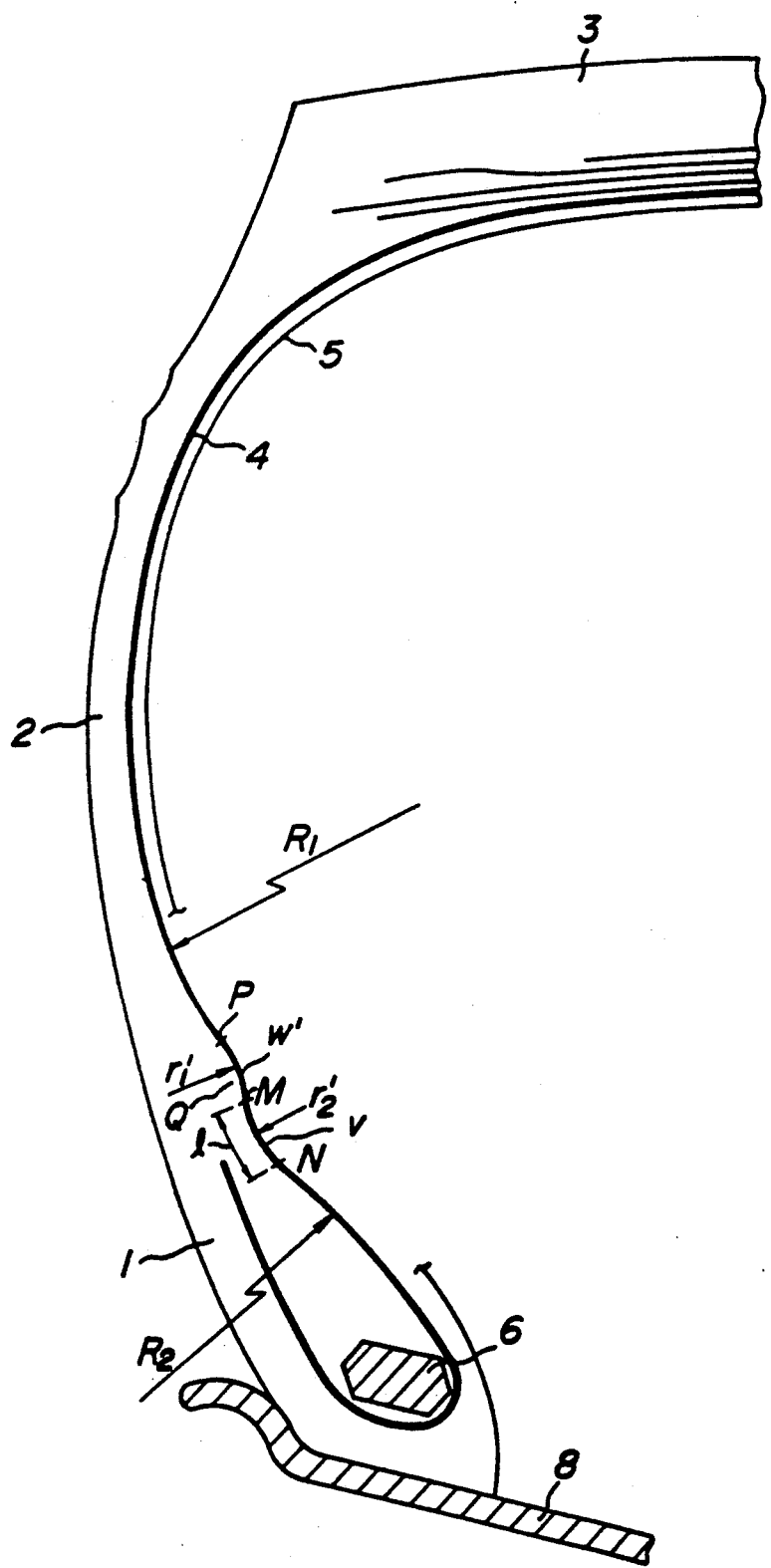

FIGS. 1a and 1b, 2 and 3a-3c illustrate one example of carcass profile of a radial tire according to the invention.

In each drawing, the tire comprises bead portions 1, sidewalls 2, a tread 3, a carcass 4, an inner liner 5, bead cores 6, and a belt 7. Reference numeral 8 denotes a rim. Each Figure shows a radial section of one half of a left half of a tire or its principal portion. The carcass 4 is schematically shown in thick solid lines. Bead reinforcing members such as bead chafers and stiffeners are omitted in the drawings and the inner liners 5 are partially omitted as the case may be.

Plies of the carcass 4 having radially arranged cords are turned up about the bead cores 6 from inside to outside of the tire. It is assumed that a radial end of the turn-up end from the bead base or a rim diameter line RL is h, while a maximum radial height of a pass line of the carcass 4 from the line RL is H. A curvature changing area v of the carcass pass line is located between points M and N spaced a distance l within 10 mm along the pass line in a first pass line area extending over radial or vertical distance g on both sides of a line of the radial distance h from the rim diameter line RL over radial or vertical distances g which are 8% of the maximum height H. In this case, a difference between angles $\theta_M$ and $\theta_N$ is preferably 5°-90° where the angles $\theta_M$ and $\theta_N$ are formed by the rim diameter line RL and tangents m-m' and n-n' to the pass line of the carcass 4 at the points M and N.

In a self-retaining or holding position of the tire (refer to solid lines in FIG. 1b) when inner pressure is filled in the tire mounted on the rim to 5% of a standard or normal inner pressure under no-load condition, the curvature changing area v of the carcass pass line curves toward the turn-up end of the ply (concave as viewed from the inside of the tire) as shown in FIGS. 1a and 1b. Under the normal inner pressure as shown in broken lines in FIG. 1b, however, the pass line of the carcass 4 is deformed so as to be smoothly continuous as the tire being inflated owing to the inner pressure, with the result that compressive stresses are caused in the bead portions 1 in the proximities of the turn-up ends of the ply to mitigate the tensile strains.

As the compressive stresses serve to reduce the tensile strains under no-load and inner pressure filled condition, effective reduction in tensile strain in the bead portions at the turn-up ends of the ply is accomplished when the tire is running so that failures of the bead portions are effectively avoided.

FIG. 2 illustrates a zone w of a carcass pass line which is adjacent the curvature changing area v on a side remote from the bead core 6 and radially outwardly extends to a point K spaced a distance j to i (FIG. 1a) from the turn-up end of the carcass corresponding to 12-24% of the maximum radial height H of the pass line of the carcass 4. The carcass pass line within the zone w has a curvature within 1/500 (mm$^{-1}$).

Compressive stresses are caused in the bead portions to reduce the tensile strains in the same manner as that shown in FIG. 1a.

FIG. 3a illustrates a curvature changing area w' of a carcass pass line which is adjacent the area v on the side remote from the bead core 6 and radially outwardly extends to a point P spaced a distance j (FIG. 1a) from the turn-up end of the carcass corresponding to 12% of the maximum radial height H of the pass line of the carcass 4. The pass line of the carcass 4 in the area w' between the points P and Q has a center of the curvature out of the tire. As is clear from FIG. 3c, compressive stresses occur in the proximity of the turn-up ends to mitigate tensile strains in the same manner as in FIG. 1a. The zone w' is smoothly continuous with the curvature changing area v through an inflection point of the carcass pass line.

According to the invention, by providing the curvature changing area v in the carcass pass line the durability of beads can be improved with tire constituting members as they are without changing the construction of tires and members of bead portions. Therefore, the invention is advantageous in quality and productivity of tires.

The particular carcass profile as above described can be obtained by controlling distribution of rubber thicknesses from inner walls to the carcass ply on inner sides of axial directions of the tire in forming and vulcanizing the rubber. If it is needed to severely control variations and irregularities in the carcass line due to so-called "rubber flow", the following measures are effective.

Figure 4:
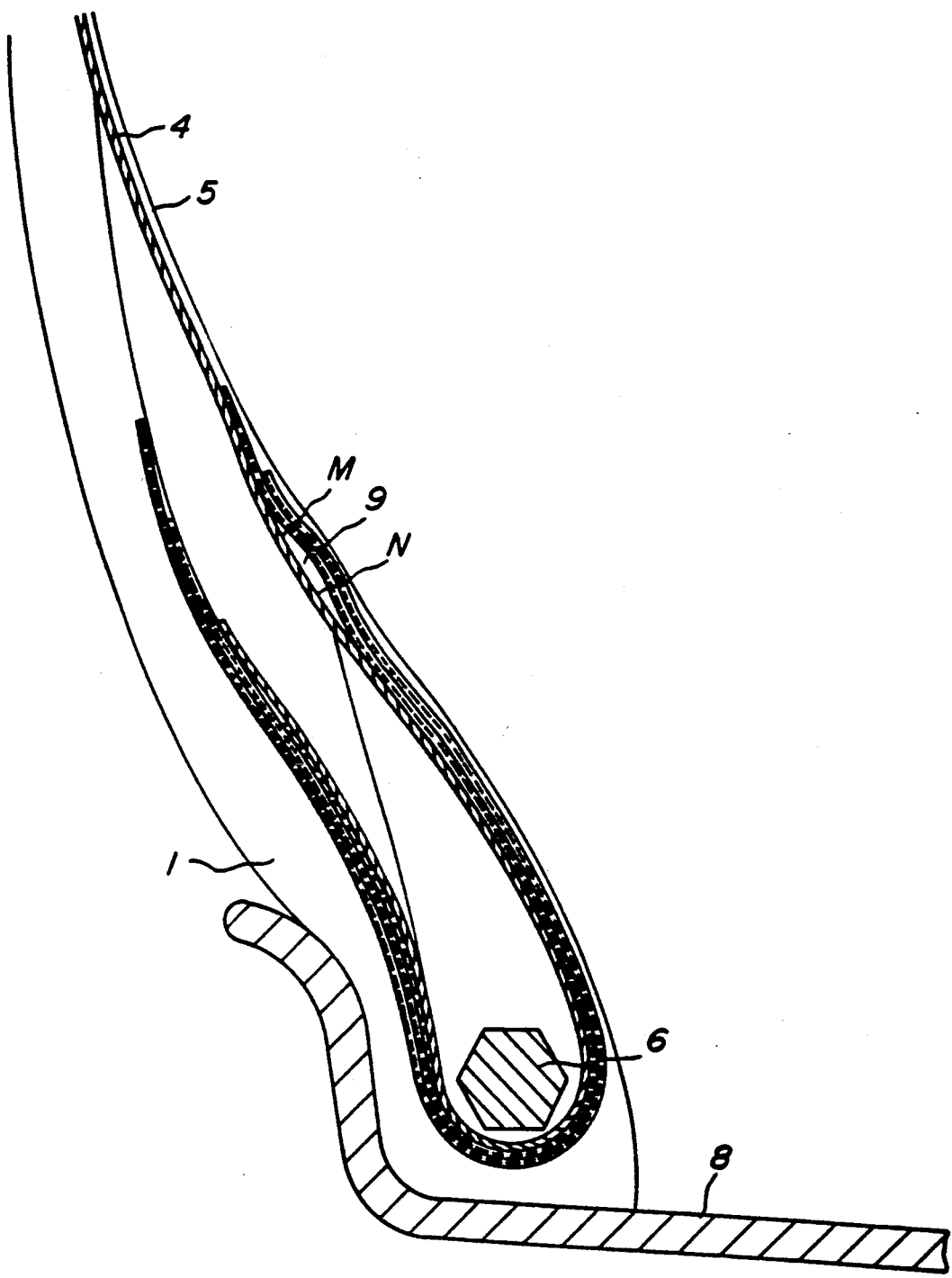
FIGS. 4-7 are sectional views illustrating sections of embodiments of tires according to the invention.
Figure 5:
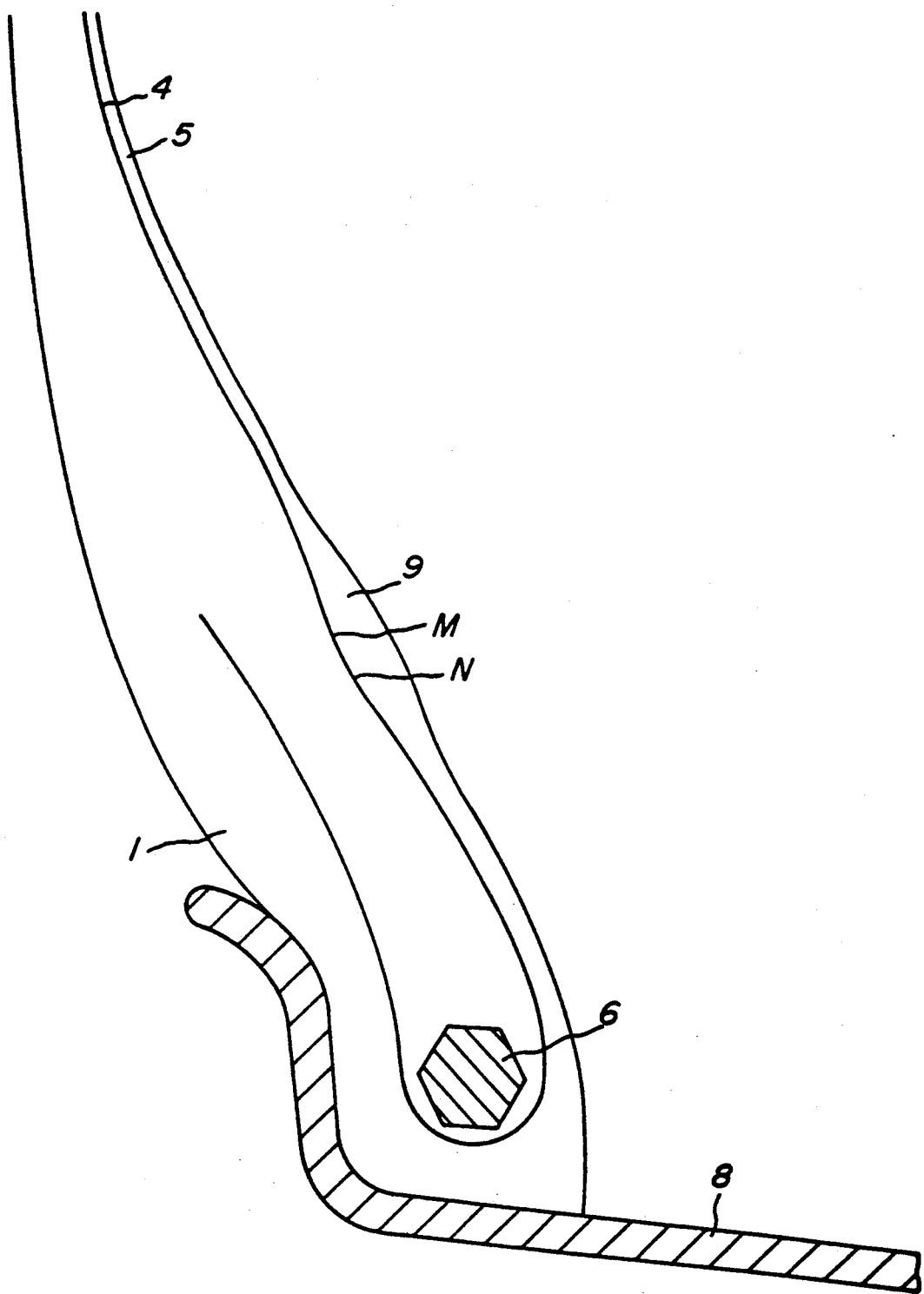
Figure 7:
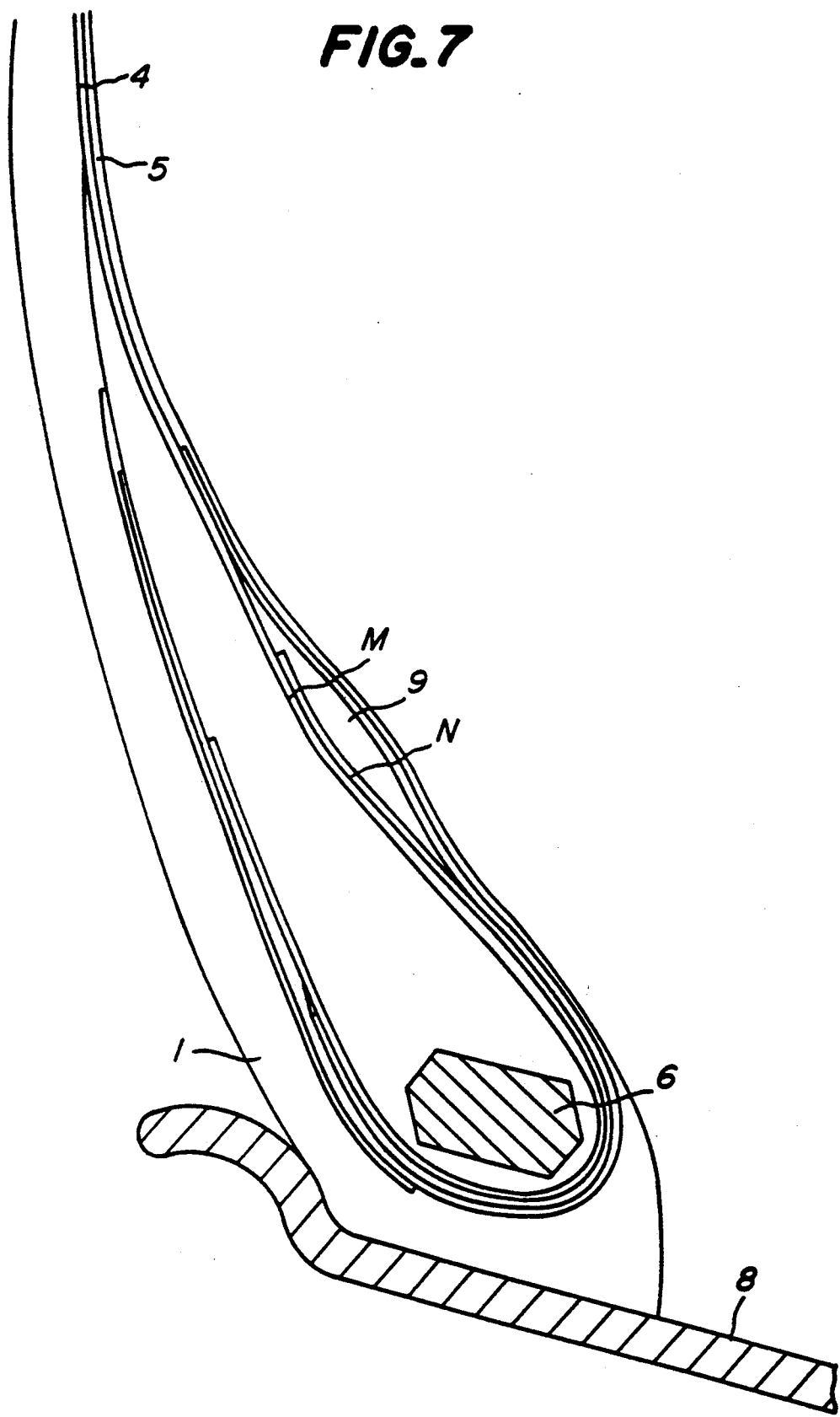

With tires formed by conventional forming and vulcanizing methods, a carcass ply extending between bead cores is arranged along an inner surface of the tire. In contrast herewith, according to the invention, as shown in FIGS. 4, 5 and 7, wedge rubbers 9 in the form of a convex lens in section are previously arranged on an inner surface of the carcass correspondingly to the carcass profile changing areas v or inner liners 5 are used which are formed with portions 5' having partially different thicknesses.

Moreover, the above curvature changing area v can be obtained in the carcass pass line by providing a vulcanizing bladder with continuous ridges at positions corresponding to the curvature changing area v.

Therefore, the variations and irregularities of the carcass pass line in production can be restrained with the aid of these measures in this manner.

The tire according to the invention comprises carcass pass line curvature changing area v in which the carcass profile in radial section is concave as viewed form the inside of the tire in the self-standing position of the tire when 5% of a standard or normal inner pressure is filled in the tire. When the tire is filled with the normal inner pressure, deformations in the carcass and the rubber accompanying therewith are caused concentrically in the concave portions and the proximities thereof so that the tensile strains occurring in the rubber at the bead portions facing to the turn-up portions of the carcass 4 are mitigated compensatingly by causing deformations concentrically in the concave portions, thereby accomplishing the improvement of the durability of the bead portions.

In order to concentrate the deformations in the concave portions, the concave portions are required to have considerably large curvatures in comparison with the other portions and at the same time have portions that difference between angles of the tangents m-m' and n-n' to the carcass pass line at the two points M and N spaced a distance less than 10 mm along the carcass relative to the rim diameter line RL is more than 5°.

In order to mitigate the tensile strains occurring at ends of the ply with the aid of the effect of the deformations concentrated in the concave portions, moreover, the concave portions and the ends of the ply must be sufficiently adjacent each other. In other words, the concave portions must be arranged on the carcass pass line within the range between the heights h−g and h+g from the rim diameter line RL as shown in FIGS. 1-3, where the distance g is 8% of the maximum height H of the carcass line.

Although it is required for the concave portions to have curvatures large enough in comparison with those of the other portions of the carcass, if such large curvatures exist in a too wide range of the carcass, the required concentration of deformations cannot be accomplished when the normal inner pressure is filled in the tire.

It is therefore needed to provide portions having small curvatures on sides of the tire rotational axis and tire tread with respect to the concave portions. However, since the stiffeners and chafers as reinforcing members are arranged on the side of the rotating axis of the tire, the rigidity of the carcass on this side is very high. Therefore, the carcass profile on this side is not susceptible to deformation of the tire caused by filling the inner air pressure. Accordingly, it is desired to make the curvatures small enough over sufficient length more than 12% of the maximum height H of the carcass line adjacent the concave portions on the side of the tread with radii of curvature more than 500 mm as shown in FIGS. 1a and 1b.

Instead of the portions of the carcass line having small radii of curvature, the carcass line may have portions which form convex portions as viewed from inside the tire. With such a feature, the deformations of the tire can be concentrated into the concave portions when filling the normal inner pressure to reduce the strains at the ends of the carcass ply, thereby improving the durability of the bead portions.

Figure 3B:
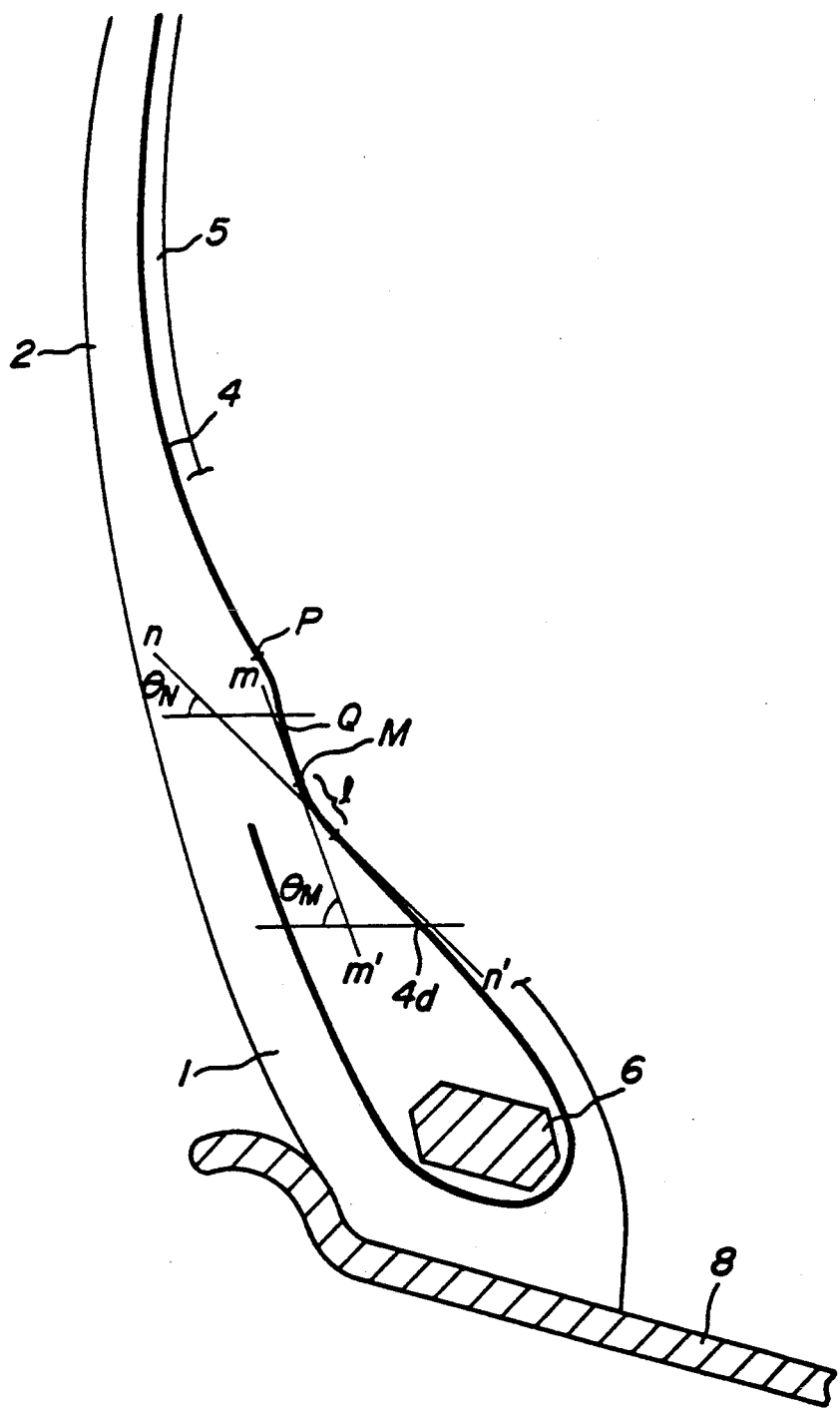

In other words, as shown in FIGS. 3a-3c, it is effective that the carcass ply 4 has a convex portion as viewed from the inside of the tire within a range between 24% of the maximum height H of the carcass line as measured from relative to other portions of said pass line the height h at the turn-up end of the carcass ply toward the tread side and 8% of the maximum height H corresponding to a height of turn-up ends of the ply the tire rotating axis. The range is preferably between 12% of the maximum height H on the tread side and 8% of the maximum height H on the tire rotating axis.

In order to bring carcass pass lines of the tires into control of variations and irregularities in production of tires due to "rubber flow" in vulcanization according to the invention, it is effective to arrange wedge rubbers 9 in the proximity of the concave portions on axially inner sides of the carcass ply to make smooth the inner walls of the tire or to form convex portions viewed from the inner side of the tire rotating axis.

Figure 8:
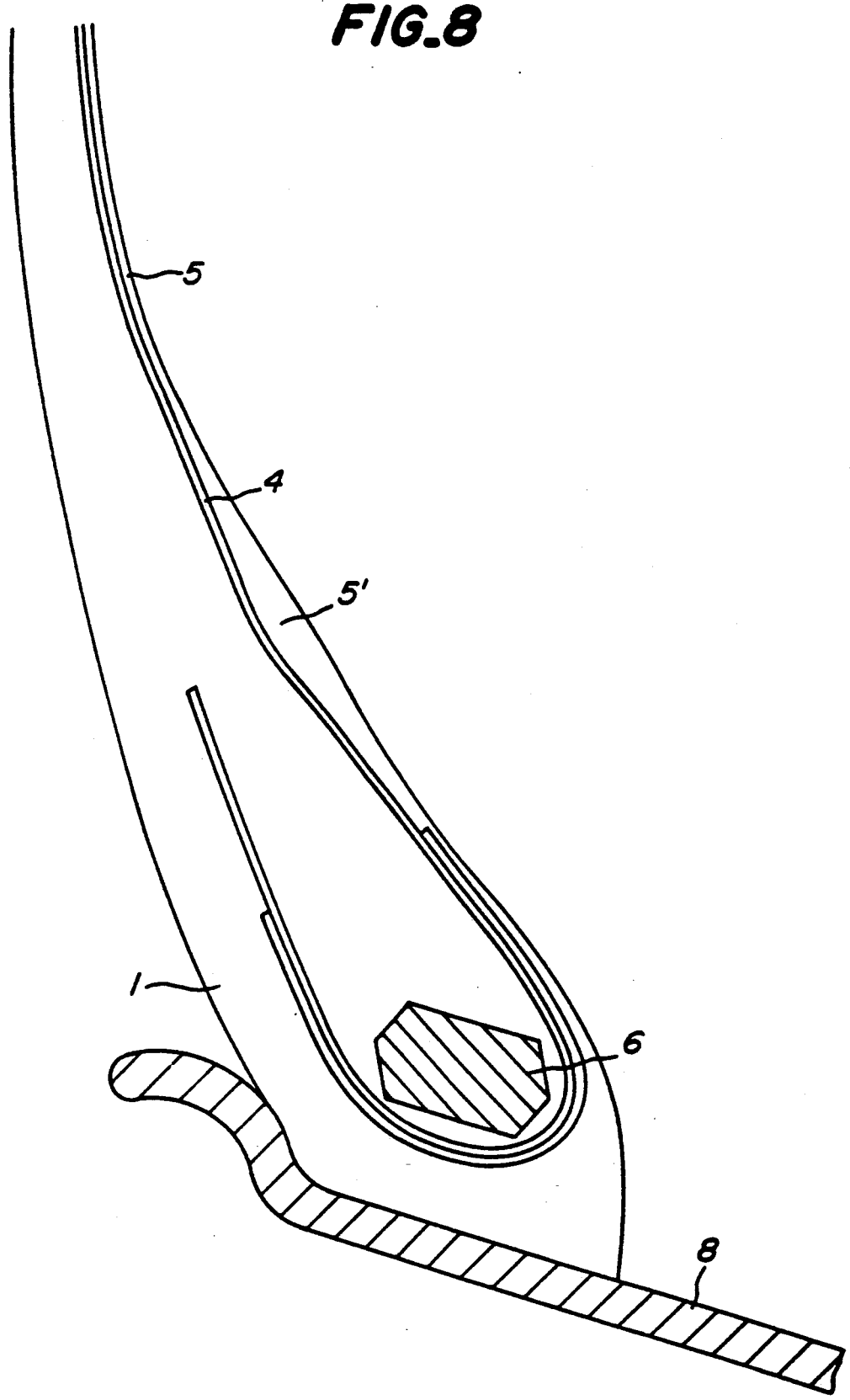
FIG. 8 is a sectional view illustrating a section of another embodiment of a tire according to the invention.

It is recommendable for the same purpose to partially changing the thicknesses of the inner liners 5 in the proximities of the concave portions as shown in FIG. 8, although it is uniform in thickness in the conventional form.

In order to sufficiently restrain variation in carcass pass line, it is more desirable to have thicknesses of the inner liners in the proximities of the concave portions 1.7 to 8 times, preferably 2 to 4 times an average thickness of the entire inner liners.

EXAMPLE 1

FIG. 4 illustrates one embodiment of the invention which is a lug pattern tire (size: 10.00 R20) having two nylon chafers and one wire chafer as shown in the drawing. A maximum height H of the carcass line from a rim diameter line RL is 233 mm. A height h of ply ends is 66.5 mm. Two points M and N on the carcass line are positioned at heights 72 mm (h+0.024 H) and 65.5 mm (h−0.004 H) respectively and spaced 7 mm from each other. A difference between angles of tangents at the points M and N to the carcass pass line relative to the rim diameter line RL is 6.0°.

Adjacent the concave portions as viewed from inside of the tire, portions of the carcass pass line on the side of the tread are substantially straight line in section over 30 mm (0.129 H) length. On the other hand, rubbers in the form of a lens in section having 20 mm width and 2 mm maximum thicknesses are arranged between the carcass ply and the nylon chafer adjacent thereto.

Tires as above described were produced by way of trial and durability at bead portions of these tires was tested in a drum running test. In the drum test, a tire to be tested was urged against a drum and the drum was rotated to drive the tire. A running distance of these tires increased about 16% in comparison with tires of natural equilibrium carcass profile according to the prior art.

EXAMPLE 2

FIG. 5 illustrates another embodiment of the tire according to the invention which is a rib pattern tire (size: 10.00 R20) having two nylon chafers and one wire chafer. A maximum height H of the carcass line from a rim diameter line RL is 241 mm and a height h of ply ends is 67 mm. Two points M and N on the carcass pass line are positioned at heights 65.7 mm (h−0.005 H) and 59.2 mm (h−0.032 H) respectively and spaced 7.8 mm from each other. A difference between angles of tangents at the points M and N to the carcass line relative to the rim diameter line is 14°.

Adjacent the concave portions as viewed from an inside of the tire, portions of the carcass ply on the side of the tread and extending to a height of 90 mm (h+0.099 H) form convex portions as viewed from the inside of the tire. On the other hand, wedge rubbers in the form of a convex lens in section having 20 mm width and 2.7 mm maximum thicknesses are arranged on an axial inside of an inner liner.

Tires as above described were produced by way of trial and durability at bead portions of these tires was tested in the drum running test. It was found in the test that a running distance of these tires increased about 15% in comparison with tires of natural equilibrium carcass profile according to the prior art.

EXAMPLE 3

Figure 6:
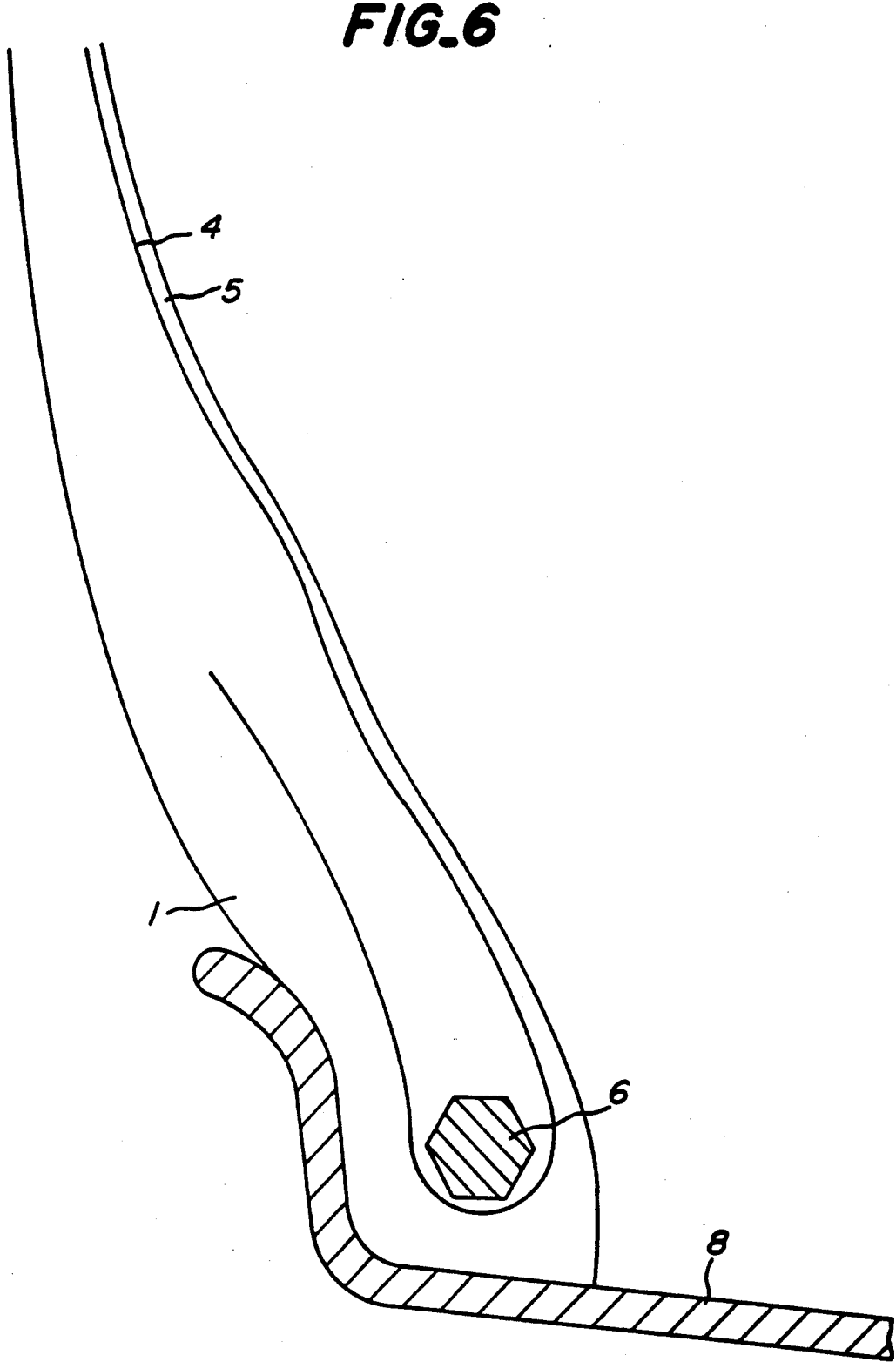

FIG. 6 illustrates a further embodiment of the tire according to the invention which is a rib pattern tire (size: 10.00 R20) having two nylon chafers and one wire chafer. A maximum height H of the carcass line from a rim diameter line RL is 241 mm and a height of the ply ends is 67 mm. Two points M and N on the carcass pass line are positioned at heights 68.3 mm (h+0.005 H) and 62.8 mm (h−0.017 H) respectively and spaced 6 mm from each other. A difference between angle of tangents at the points M and N to the carcass pass line relative to the rim diameter line RL is 6.0°.

Adjacent the concave portions as viewed from an inside of the tire, portions of the carcass ply on the side of the tread and extending to a height of 95 mm (h+0.116 H) form convex portions as viewed from the inside of the tire.

Tires as above described were produced by way of trial and durability at bead portions of these tires was tested in the drum running test. It was found in the test that a running distance of these tires increased about 18% in comparison with tires of natural equilibrium carcass profile according to the prior at.

EXAMPLE 4

FIG. 7 illustrates a further embodiment of the tire according to the invention which is a block pattern tire (size: 11/70 R22.5) having two nylon chafers and one wire chafer. A maximum height H of the carcass line from a rim diameter line RL is 165.5 mm and a height h of ply ends is 34 mm. Two points M and N on the carcass path line are positioned at heights 46.3 mm (h+0.074 H) and 42.1 mm (0.049 H) respectively and spaced 5.2 mm from each other. A difference between angles of tangents at the points M and N to the carcass line relative to the rim diameter line is 8.5°.

Adjacent the concave portions as viewed from an inside of the tire, portions of the carcass pass line on the side of the tread are substantially straight line in section over 22 mm (0.133 H) length. On the other hand, reinforcing rubbers in the form of a lens in section having 20 mm width and 2.5 mm maximum thicknesses are arranged between the two chafers.

Tires as above described were produced by way of trial and durability at bead portions of these tires was tested in the drum running test. A running distance of these tires increased about 12% in comparison with tires of natural equilibrium carcass profile according to the prior art.

As can be seen from the above description, according to the invention the durability at bead portions of heavy duty radial tires can be assuredly improved to an extent required for prolongation of life time obtained by recapping the tire repeatedly.

It is further understood by those skilled in the art that the foregoing description is that of preferred embodiments of the disclosed tires and that various changes and modifications may be made in the invention without departing from the spirit and scope thereof.

What is claimed is:

1. A pneumatic radial tire with high durable bead portions, comprising; a pair of bead portions each having a bead core, a pair of sidewalls and a tread extending between the sidewalls, a carcass extending between the bead portions and consisting of plies with cords radially arranged, at least one ply being turned up about said bead cores of the bead portions from inside to outside of the tire in a turn-up construction, wherein a carcass pass line in radial section of the tire in its self-holding position filled with 5% of a normal inner pressure under no-load condition comprises curvatures changing areas (v) in a carcass pass line curved toward the turned-up portions in the proximities of positions corresponding to a height (h) of turn-up ends of the ply from a bead base line to cause compressive stresses in the bead portions near the turn-up ends of the ply by deformations of the carcass when the tire is filled to normal inner pressure, each of said curvature changing areas (v) of the carcass pass line is smoothly continuous with a zone (w') on a side remote from the bead core through an inflation point of the carcass pass line and is within a carcass pass line area ext ending a radial distance corresponding to 8% of a maximum radial height (H) of the carcass pass line measured from the bead base line on radially inward and outward side of the turn-up ends of the ply, and curvature changing areas (v) of said pass line have large curvatures with two circumferentially spaced tangential points on said pass line having a difference in angles of said tangents greater than 5°, and said zone (w') is located in a portion of the carcass pass line between two points (P) and (Q) radially spaced from said height (h) by a radial distance (i) corresponding to 24% of said maximum radial height (H), and a radial distance (j) corresponding to 12% of said maximum radial height (H) and said carcass pass line in zone w' having a center of curvature located outside of the tire.

2. A pneumatic radial tire as set forth in claim 1, wherein said tire comprises wedge rubbers in the form of a convex lens in section along the curvature changing areas (v) inside the carcass.

3. A pneumatic radial tire as set forth in claim 1, wherein said tire comprises inner liners extending along an inner circumference of the carcass and each of the inner liners comprises a thick portion corresponding to the curvature changing portion (v) of the carcass pass line.

4. A pneumatic radial tire as set forth in claim 3, wherein a thickness of the thicker portion of the inner liner is 1.7 to 8 times an average thickness of the entire inner liner.

5. A pneumatic radial tire as set forth in claim 4, wherein said thickness of the thicker portion of the inner liner is 2 to 4 times the average thickness of the entire inner liner.

* * * * *